US012259670B2

(12) United States Patent
Ebukuro et al.

(10) Patent No.: US 12,259,670 B2
(45) Date of Patent: Mar. 25, 2025

(54) TUBULAR FIXING MEMBER, FIXING DEVICE, AND IMAGE FORMING APPARATUS

(71) Applicant: FUJIFILM Business Innovation Corp., Tokyo (JP)

(72) Inventors: Shingo Ebukuro, Kanagawa (JP); Yasuhiko Kinuta, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 2 days.

(21) Appl. No.: 18/446,134

(22) Filed: Aug. 8, 2023

(65) Prior Publication Data

US 2024/0295846 A1 Sep. 5, 2024

(30) Foreign Application Priority Data

Mar. 2, 2023 (JP) ................................ 2023-032012

(51) Int. Cl.
*G03G 15/20* (2006.01)

(52) U.S. Cl.
CPC ................................ *G03G 15/2057* (2013.01)

(58) Field of Classification Search
CPC .................................................. G03G 15/2057
See application file for complete search history.

(56) References Cited

U.S. PATENT DOCUMENTS

2016/0109836 A1* 4/2016 Tsuchihashi ....... G03G 15/2057 399/333
2016/0370739 A1* 12/2016 Murata ................ G03G 15/206
2018/0373183 A1* 12/2018 Murata ................... B32B 7/022

FOREIGN PATENT DOCUMENTS

JP 10-213991 A 8/1998
JP 2005-010607 A 1/2005
JP 2015-036752 A 2/2015
JP 2019-211701 A 12/2019

* cited by examiner

*Primary Examiner* — Walter L Lindsay, Jr.
*Assistant Examiner* — Michael A Harrison
(74) *Attorney, Agent, or Firm* — Sughrue Mion, PLLC

(57) ABSTRACT

A tubular fixing member including a substrate, an elastic layer, an interlayer, and a surface layer are laminated in this order, in which "E1<E2" is satisfied in a case where a storage elastic modulus of the elastic layer is denoted by E1 and a storage elastic modulus of the interlayer is denoted by E2.

9 Claims, 4 Drawing Sheets

TUBULAR FIXING MEMBER, FIXING DEVICE, AND IMAGE FORMING APPARATUS

CROSS-REFERENCE TO RELATED APPLICATIONS

This application is based on and claims priority under 35 USC 119 from Japanese Patent Application No. 2023-032012 filed Mar. 2, 2023.

BACKGROUND

(i) Technical Field

The present disclosure relates to a tubular fixing member, a fixing device, and an image forming apparatus.

(ii) Related Art

JP2015-036752A discloses a fixing member including: a substrate; an elastic layer that contains carbon nanotubes having an average length of 100 μm or more and a filler other than the carbon nanotubes by 50% by volume or less in a total volume and has a thermal conductivity of 1.6 W/m·K or more; and a surface layer.

JP2019-211701A discloses a fixing member that includes a base body and an elastic layer containing silicone rubber and a filler. In a case where a thermal conductivity of the elastic layer in a thickness direction is denoted by λnd, a thermal conductivity of the elastic layer in a circumferential direction is denoted by λtd, and a thermal conductivity of the elastic layer in a width direction is denoted by λmd, λnd is 1.30 W/m·K or more and "λnd>λmd>λtd" is satisfied.

JP2005-010607A discloses a rotating body for fixing which includes a base body and a release layer and in which the thermal resistance of a surface layer region having a depth of 50 μm from a surface of the substrate facing the release layer is 10 $cm^2$·sec·° C./cal (2.4 $cm^2$·° C./W) or less.

JP1998-213991A discloses a fixing member which includes a plurality of elastic layers on a core and in which at least one elastic layer L1 is laminated on an elastic layer L2 having a surface roughness Rz of 10 μm or more.

SUMMARY

Aspects of non-limiting embodiments of the present disclosure relate to a tubular fixing member, a fixing device, and an image forming apparatus in which wrinkles are less likely to occur on a surface layer.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above-described object includes the following aspect.

According to an aspect of the present disclosure, there is provided a tubular fixing member including a substrate, an elastic layer, an interlayer, and a surface layer laminated in this order, in which "E1<E2" is satisfied in a case where a storage elastic modulus of the elastic layer is denoted by E1 and a storage elastic modulus of the interlayer is denoted by E2.

BRIEF DESCRIPTION OF THE DRAWINGS

Exemplary embodiment(s) of the present invention will be described in detail based on the following figures, wherein.

DETAILED DESCRIPTION

Figure 1:
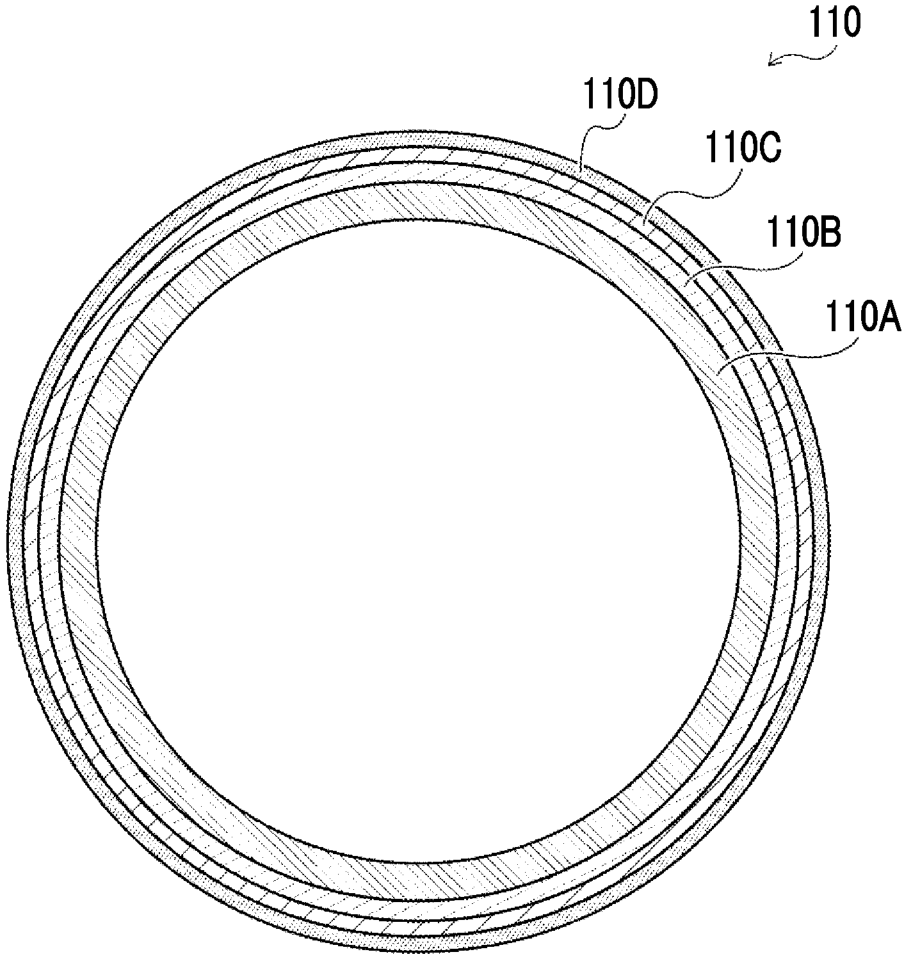
FIG. 1 is a schematic cross-sectional view showing an example of a tubular fixing member according to an exemplary embodiment of the present disclosure.

Exemplary embodiments of the present disclosure will be described below. The description and examples of these exemplary embodiments illustrate the exemplary embodiments and do not limit the scopes of the exemplary embodiments.

A numerical range indicated using "to" in the present disclosure indicates a range that includes numerical values written in the front and rear of "to" as a minimum value and a maximum value, respectively.

With regard to numerical ranges described stepwise in the present disclosure, an upper limit or a lower limit described in one numerical range may be replaced with an upper limit or a lower limit of another numerical range described stepwise. Further, with regard to a numerical range described in the present disclosure, the upper limit or the lower limit of the numerical range may be replaced with values shown in Examples.

In the present disclosure, the term "step" includes not only an independent step but also a step in a case where the intended purpose of the step is achieved even in a case where the step cannot be clearly distinguished from another step.

In the case where an exemplary embodiment is described with reference to the drawings in the present disclosure, the configuration of the exemplary embodiment is not limited to the configuration shown in the drawings. The sizes of members in each drawing are conceptual, and a relative relationship between the sizes of the members is not limited thereto.

In the present disclosure, each component may include a plurality of types of corresponding substances. In the case where the amount of each component contained in a composition is mentioned in the present disclosure and a plurality of types of substances corresponding to each component are present in the composition, the amount of each component means a total amount of the plurality of types of substances present in the composition unless otherwise specified.

In the present disclosure, a plurality of types of particles corresponding to each component may be included. In a case where a plurality of types of particles corresponding to each component are present in the composition, the particle diameter of each component means a value for a mixture of the plurality of types of particles present in the composition unless otherwise specified.

In the present disclosure, "axial direction" of a tubular fixing member means a direction in which a rotation axis of the tubular fixing member extends and "circumferential direction” of the tubular fixing member means a rotation direction of the tubular fixing member.

Tubular Fixing Member

A tubular fixing member according to an exemplary embodiment of the present disclosure is a tubular fixing member in which a substrate, an elastic layer, an interlayer, and a surface layer are laminated in this order.

FIG. 1 is a schematic cross-sectional view showing an example of the layer configuration of the tubular fixing member according to the exemplary embodiment of the present disclosure.

The tubular fixing member 110 shown in FIG. 1 includes a substrate 110A, an elastic layer 110B that is provided on the substrate 110A, an interlayer 110C that is provided on the elastic layer 110B, and a surface layer 110D that is provided on the interlayer 110C. An adhesive layer may be provided between the substrate 110A and the elastic layer 110B, between the elastic layer 110B and the interlayer 110C, or between the interlayer 110C and the surface layer 110D.

In a case where a storage elastic modulus (MPa) of the elastic layer is denoted by E1 and a storage elastic modulus (MPa) of the interlayer is denoted by E2, “E1<E2” is satisfied in the tubular fixing member according to the exemplary embodiment of the present disclosure. The storage elastic modulus is an index that indicates hardness against vibrational energy. “E1<E2” means that the interlayer is harder against vibrational energy than the elastic layer.

Since “E1<E2” is satisfied, the tubular fixing member according to the exemplary embodiment of the present disclosure suppresses the occurrence of wrinkles on the surface layer. A mechanism thereof is supposed as follows.

Whenever an image is formed, stress and strain are generated in the tubular fixing member. As the formation of an image is repeated, strain is accumulated in the surface layer of the tubular fixing member. As a result, wrinkles occur on the surface layer of the tubular fixing member and cause image defects in a fixed image. From the viewpoint of the fixing property of an image, it is desired that the surface layer of the tubular fixing member is thin to realize quick heat conduction. However, as the surface layer of the tubular fixing member is thinner, wrinkles greatly occur.

On the other hand, in a case where an interlayer harder than the elastic layer is present between the elastic layer and the surface layer of the tubular fixing member, the accumulation of strain in the surface layer is suppressed. As a result, the occurrence of wrinkles on the surface layer is suppressed.

From the viewpoint of further suppressing the occurrence of wrinkles on the surface layer, a ratio E2/E1 of E2 to E1 is, for example, preferably 1.2 or more and 5.0 or less, more preferably 1.4 or more and 3.0 or less, and still more preferably 1.6 or more and 2.5 or less.

A method of measuring the storage elastic moduli (MPa) of the elastic layer and the interlayer of the tubular fixing member according to the exemplary embodiment of the present disclosure is as follows.

Each of the elastic layer and the interlayer is cut into a rectangular shape having a length of 20 mm in the axial direction and a length of 4 mm in the circumferential direction, and each of the cut elastic layer and the cut interlayer is used as a sample for measurement. The sample is placed on a dynamic viscoelasticity measuring device; and the dynamic viscoelasticity of the sample is measured under conditions of a temperature of 30° C., a frequency of 10 Hz, a load of 10 gf, and an amplitude of 10 μm to obtain the storage elastic modulus (MPa) of the sample.

“E1<E2” can be controlled using, for example, the type of an elastic material of the elastic layer and the type and amount of filler to be contained in the interlayer.

Each layer of the tubular fixing member according to the exemplary embodiment of the present disclosure will be described in detail below.

Substrate

The shape and size of the substrate may be selected depending on the shape and size of the tubular fixing member. Examples of the shape of the substrate include a cylindrical shape and a belt shape.

Examples of a material of the substrate include: resins, such as a polyimide resin, a polyamide resin, a polyamide-imide resin, and a polybenzimidazole resin; metals, such as aluminum, copper, stainless steel (SUS), iron, and nickel; and the like. From the viewpoint of bending durability, it is desired that the substrate is made of a resin.

Additives, such as reinforcing agents (carbon black and the like), fillers (calcium carbonate and the like), antistatic agents, and release agents, may be contained in the substrate made of a resin.

From the viewpoint of durability and thermal conductivity, an average thickness of the substrate is, for example, preferably 30 μm or more and 200 μm or less, more preferably 40 μm or more and 150 μm or less, and still more preferably 50 μm or more and 100 μm or less.

Elastic Layer

Examples of the elastic material of the elastic layer include a fluororesin, a silicone resin, fluororubber, silicone rubber, fluorosilicone rubber, and the like. It is desired that silicone rubber is used as the elastic material of the elastic layer.

Examples of the silicone rubber include RTV silicone rubber, HTV silicone rubber, liquid silicone rubber, and the like. More specifically, examples of the silicone rubber include polydimethyl silicone rubber (MQ), methyl vinyl silicone rubber (VMQ), methyl phenyl silicone rubber (PMQ), fluorosilicone rubber (FVMQ), and the like.

A ratio of the silicone rubber to the elastic material of the elastic layer is, for example, preferably 80% by mass or more, more preferably 90% by mass or more, still more preferably 95% by mass or more, and even more preferably 100% by mass.

For example, the elastic layer may contain additives, such as reinforcing agents (carbon black and the like), fillers (calcium carbonate and the like), softeners, processing aids, and anti-aging agents.

From the viewpoint of making wrinkles less likely to occur on the surface layer, the storage elastic modulus E1 of the elastic layer is, for example, preferably 0.1 MPa or more and 5.0 MPa or less, more preferably 0.2 MPa or more and 3.0 MPa or less, and still more preferably 0.3 MPa or more and 1.0 MPa or less.

From the viewpoint of an excellent fixing property of an image, the thermal conductivity $\lambda 1z$ of the elastic layer in a thickness direction is, for example, preferably 0.6 W/m·K or more and 1.4 W/m·K or less, more preferably 0.8 W/m·K or more and 1.4 W/m·K or less, and still more preferably 0.8 W/m·K or more and 1.2 W/m·K or less.

A method of obtaining the thermal conductivity of the elastic layer is as follows.

The elastic layer is cut into a square shape having a length of 2 mm in the axial direction and a length of 2 mm in the circumferential direction, and the cut elastic layer is used as a sample for measurement. The sample is placed on a thermal diffusivity measuring device, the thermal diffusivity of the sample is measured at a room temperature (25° C.±3° C.), and the thermal diffusivity, density, and specific heat are multiplied together to calculate the thermal conductivity (W/m·K) of the sample. The thermal conductivities of the sample in the axial direction, the circumferential direction, and the thickness direction are measured depending on the orientation of the sample in a case where the sample is interposed between a pair of measurement terminals of the thermal diffusivity measuring device.

From the viewpoint of an excellent fixing property of an image, an average thickness of the elastic layer is, for example, preferably 300 μm or less, more preferably 280 μm or less, and still more preferably 250 μm or less.

From the viewpoint of the durability of the tubular fixing member, the average thickness of the elastic layer is, for example, preferably 100 μm or more, more preferably 150 μm or more, and still more preferably 180 μm or more.

It is preferable that the average thickness of the elastic layer is larger than, for example, an average thickness of the interlayer. From the viewpoint of the fixing property of an image and the durability of the tubular fixing member, a ratio T1/T2 of the average thickness T1 of the elastic layer to the average thickness T2 of the interlayer is, for example, preferably 1.5 or more and 80 or less, more preferably 1.8 or more and 60 or less, and still more preferably 2.0 or more and 50 or less.

The average thickness of the elastic layer is an arithmetic average value of the thicknesses of the layer that are measured by an eddy current film thickness meter at a total of 40 points, that is, at 10 points arranged at regular intervals in the axial direction of the tubular fixing member at each of four points arranged at intervals of 90° in the circumferential direction.

Interlayer

The interlayer may be a metal layer, or may be a layer that contains resins and thermally conductive fillers. From the viewpoint of bending durability, it is desired that the interlayer is a resin layer containing resins and thermally conductive fillers.

In a case where the interlayer is a metal layer, examples of the material of the interlayer include metals, such as aluminum, copper, SUS, iron, tin, zinc, and nickel, and alloys of these metals.

In a case where the interlayer is a resin layer containing resins and thermally conductive fillers, it is desired that the resin has heat resistance. Examples of the resins having heat resistance include a polyimide resin, a polyamide resin, a polyamideimide resin, a thermotropic liquid crystal polymer, a fluororesin, a silicone resin, fluororubber, silicone rubber, fluorosilicone rubber, and the like. It is desired that silicone rubber is used as a resin material of the interlayer.

Examples of the silicone rubber include RTV silicone rubber, HTV silicone rubber, liquid silicone rubber, and the like. More specifically, examples of the silicone rubber include polydimethyl silicone rubber (MQ), methyl vinyl silicone rubber (VMQ), methyl phenyl silicone rubber (PMQ), fluorosilicone rubber (FVMQ), and the like.

In a case where the interlayer is a resin layer containing resins and thermally conductive fillers, examples of the thermally conductive fillers include: carbon materials, such as carbon black, a carbon fiber, or a carbon nanotube; metal oxide particles, such as titanium oxide, alumina, and zinc oxide; fumed silica; precipitated silica; diatom earth; pulverized quartz; boron nitride; and the like.

The shape of the thermally conductive filler is not limited, and may be any one of a spherical shape, a cubic shape, a plate shape, a columnar shape, a needle shape, a rod shape, a flake shape, and the like. From the viewpoint of imparting anisotropy to the thermal conductivity of the interlayer, it is desired that thermally conductive fillers having anisotropy in a shape, such as a plate shape, a columnar shape, a needle shape, a rod shape, or a flake shape, are used.

In a case where the interlayer is a resin layer containing resins and thermally conductive fillers, a thermally conductive filler content is, for example, preferably 2% by mass or more and 20% by mass or less and more preferably 5% by mass or more and 10% by mass or less with respect to a total mass of the interlayer.

In a case where the interlayer is a resin layer containing resins and thermally conductive fillers, various additives may be contained in the interlayer. Examples of the additives include softeners (paraffin and the like), processing aids (stearic acid and the like), anti-aging agents (amine and the like), cross-linking agents, and the like.

From the viewpoint of making wrinkles less likely to occur on the surface layer, the storage elastic modulus E2 of the interlayer is, for example, preferably 0.4 MPa or more and 10.0 MPa or less, more preferably 0.6 MPa or more and 10.0 MPa or less, and still more preferably 0.6 MPa or more and 1.0 MPa or less.

In a case where the thermal conductivities of the interlayer in the axial direction, the circumferential direction, and the thickness direction are denoted by $\lambda 2x$, $\lambda 2y$, and $\lambda 2z$, respectively, it is preferable that, for example, "$\lambda 2x>\lambda 2z$" and "$\lambda 2y>\lambda 2z$" are satisfied. That is, it is desired that the interlayer is more likely to conduct heat in a plane direction than in the thickness direction.

In a case where the above-mentioned relationship is satisfied, a temperature is promoted to be uniform in the plane direction in the interlayer and the temperature unevenness of the surface layer is suppressed even though the conduction of heat from the elastic layer to the interlayer is uneven. As a result, the fixing unevenness of toner is suppressed.

"$\lambda 2x>\lambda 2z$" and "$\lambda 2y>\lambda 2z$", that is, a property that heat is more likely to be conducted in the interlayer in the plane direction than in the thickness direction can be realized in a case where, for example, thermally conductive fillers having anisotropy in a shape are arranged in the plane direction.

$\lambda 2x$ is, for example, preferably 1.0 W/m·K or more and 2.5 W/m·K or less, more preferably 1.2 W/m·K or more and 2.0 W/m·K or less, and still more preferably 1.3 W/m·K or more and 1.8 W/m·K or less.

$\lambda 2y$ is, for example, preferably 1.0 W/m·K or more and 2.5 W/m·K or less, more preferably 1.2 W/m·K or more and 2.0 W/m·K or less, and still more preferably 1.3 W/m·K or more and 1.8 W/m·K or less.

$\lambda 2z$ is, for example, preferably 0.8 W/m·K or more and 2.0 W/m·K or less, more preferably 1.0 W/m·K or more and 1.8 W/m·K or less, and still more preferably 1.1 W/m·K or more and 1.5 W/m·K or less.

A method of obtaining the thermal conductivity of the interlayer is as follows.

The interlayer is cut into a square shape having a length of 2 mm in the axial direction and a length of 2 mm in the circumferential direction, and the cut interlayer is used as a sample for measurement. The sample is placed on a thermal diffusivity measuring device, the thermal diffusivity of the sample is measured at a room temperature (25° C.±3° C.), and the thermal diffusivity, density, and specific heat are multiplied together to calculate the thermal conductivity (W/m·K) of the sample. The thermal conductivities of the sample in the axial direction, the circumferential direction, and the thickness direction are measured depending on the orientation of the sample in a case where the sample is interposed between a pair of measurement terminals of the thermal diffusivity measuring device.

In a case where the thermal conductivity of the elastic layer in the thickness direction is denoted by $\lambda 1z$ and the thermal conductivity of the interlayer in the thickness direction is denoted by $\lambda 2z$, it is preferable from the viewpoint of an excellent fixing property of an image that, for example, "$\lambda 1z<\lambda 2z$" is satisfied.

From the viewpoint of a more excellent fixing property of an image, a ratio $\lambda 2z/\lambda 1z$ of $\lambda 2z$ to $\lambda 1z$ is, for example, preferably 1.1 or more and 2.2 or less, more preferably 1.2 or more and 2.0 or less, and still more preferably 1.3 or more and 1.8 or less.

From the viewpoint of an excellent fixing property of an image, the average thickness of the interlayer is, for example, preferably 200 μm or less, more preferably 150 μm or less, and still more preferably 120 μm or less.

From the viewpoint of making wrinkles less likely to occur on the surface layer, the average thickness of the interlayer is, for example, preferably 5 μm or more, more preferably 10 μm or more, and still more preferably 50 μm or less.

The average thickness of the interlayer is an arithmetic average value of the thicknesses of the layer that are measured by an eddy current film thickness meter at a total of 40 points, that is, at 10 points arranged at regular intervals in the axial direction of the tubular fixing member at each of four points arranged at intervals of 90° in the circumferential direction.

Surface Layer

It is desired that the surface layer contains a release material having heat resistance. Examples of the release material having heat resistance include a fluororesin. Examples of the fluororesin include a tetrafluoroethylene-perfluoroalkyl vinyl ether copolymer (PFA), polytetrafluoroethylene (PTFE), a tetrafluoroethylene-hexafluoropropylene copolymer (FEP), polyethylene tetrafluoroethylene (ETFE), polyvinylidene fluoride (PVDF), polychlorotrifluoroethylene (PCTFE), vinyl fluoride (PVF), and the like.

Various additives may be contained in the surface layer. Examples of the additives include fillers (calcium carbonate and the like), functional fillers (alumina and the like), softeners (paraffin and the like), processing aids (stearic acid and the like), anti-aging agents (amine and the like), cross-linking agents, and the like.

From the viewpoint of an excellent fixing property of an image, an average thickness of the surface layer is, for example, preferably 30 μm or less, more preferably 25 μm or less, and still more preferably 20 μm or less.

From the viewpoint of making wrinkles less likely to occur on the surface layer, the average thickness of the surface layer is, for example, preferably 10 μm or more, more preferably 15 μm or more, and still more preferably 18 μm or more.

The average thickness of the surface layer is an arithmetic average value of the thicknesses of the layer that are measured by an eddy current film thickness meter at a total of 40 points, that is, at 10 points arranged at regular intervals in the axial direction of the tubular fixing member at each of four points arranged at intervals of 90° in the circumferential direction.

Examples of the tubular fixing member according to the exemplary embodiment of the present disclosure include an aspect in which a substrate containing a resin, an elastic layer containing silicone rubber, an interlayer containing a heat resistant resin and a thermally conductive filler, and a surface layer containing a fluororesin are laminated in this order. In this aspect, it is desired that silicone rubber is used as the heat resistant resin contained in the interlayer.

Method of Manufacturing Tubular Fixing Member

Examples of a method of manufacturing the tubular fixing member according to the exemplary embodiment of the present disclosure include the following (1) and (2).

(1) An outer circumferential surface of the substrate is coated with an elastic layer-forming liquid composition and the elastic layer-forming liquid composition is dried to form the elastic layer. Then, an outer circumferential surface of the elastic layer is coated with an interlayer-forming liquid composition and the interlayer-forming liquid composition is dried to form the interlayer. After that, an outer circumferential surface of the interlayer is coated with a surface layer-forming liquid composition and the surface layer-forming liquid composition is dried to form the surface layer.

(2) The elastic layer and the interlayer are formed in a manner identical to the manner of (1), and a tubular member, which is prepared in advance and serves as a surface layer, then covers the outer circumferential surface of the interlayer to form the surface layer. An adhesive layer may be formed on the outer circumferential surface of the interlayer and may be covered with the tubular member.

For example, a fluororesin tube is suitable for the tubular member serving as the surface layer. Chemical or physical etching treatment, such as liquid ammonia treatment, plasma discharge treatment, or excimer laser treatment, may be performed on an inner surface of the fluororesin tube for the purpose of improving adhesiveness to the interlayer.

The tubular fixing member according to the exemplary embodiment of the present disclosure may be a fixing belt or may be a fixing roller.

In a case where the tubular fixing member according to the exemplary embodiment of the present disclosure is a fixing belt, the tubular fixing member may be applied to either a heating belt or a pressure belt. In a case where the tubular fixing member according to the exemplary embodiment of the present disclosure is a fixing roller, the tubular fixing member may be applied to either a heating roller or a pressure roller.

Fixing Device

A fixing device according to an exemplary embodiment of the present disclosure includes a first rotating body and a second rotating body that is disposed in contact with an outer surface of the first rotating body, and causes a recording medium in which a toner image is formed on a surface to pass through a contact portion between the first rotating body and the second rotating body to fix the toner image to the recording medium. At least one of the first rotating body or the second rotating body is the tubular fixing member according to the exemplary embodiment of the present disclosure.

Examples of the fixing device according to the exemplary embodiment of the present disclosure include a first exemplary embodiment and a second exemplary embodiment.

A fixing device according to the first exemplary embodiment includes a heating roller and a pressure belt, and at least one of the heating roller or the pressure belt is the tubular fixing member according to the exemplary embodiment of the present disclosure.

A fixing device according to a second exemplary embodiment includes a heating belt and a pressure roller, and at least one of the heating belt or the pressure roller is the tubular fixing member according to the exemplary embodiment of the present disclosure.

First Exemplary Embodiment

Figure 2:
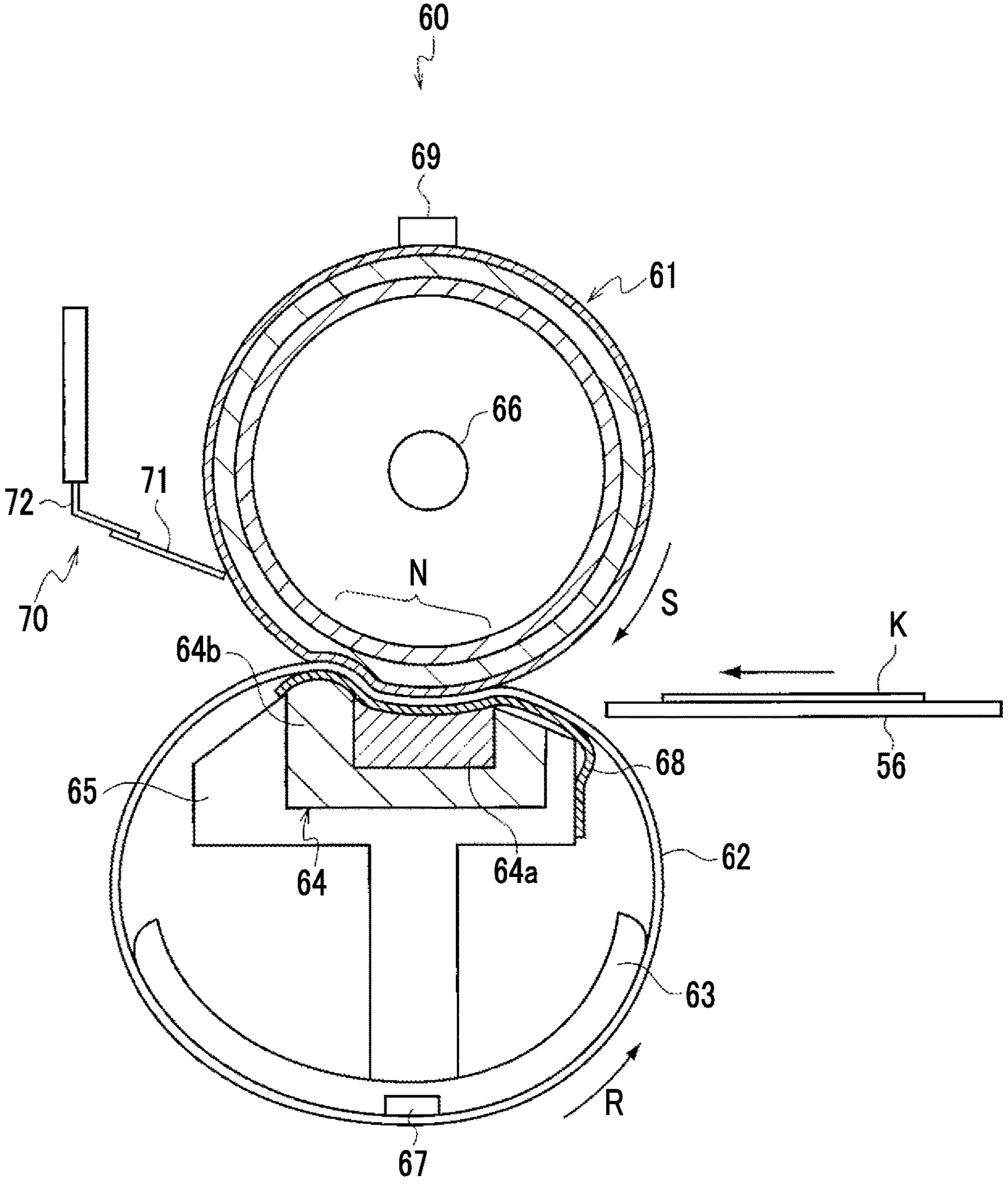
FIG. 2 is a schematic configuration diagram showing an example of a fixing device according to a first exemplary embodiment of the present disclosure.

FIG. 2 is a schematic diagram showing the fixing device 60 according to the first exemplary embodiment.

The fixing device 60 includes a heating roller 61 (an example of the first rotating body) and a pressure belt 62 (an example of the second rotating body).

A halogen lamp 66 (an example of a heating device) is disposed in the heating roller 61. A temperature-sensitive element 69 is disposed in contact with the surface of the heating roller 61. The lighting of the halogen lamp 66 is controlled on the basis of a temperature value measured by the temperature-sensitive element 69, so that the surface temperature of the heating roller 61 is maintained at a target set temperature (for example, 150° C.).

The pressure belt 62 is rotatably supported by a pressing pad 64 and a belt traveling guide 63 that are disposed inside the pressure belt 62.

The pressing pad 64 presses the pressure belt 62 against the heating roller 61. The pressure belt 62 is pressed against the heating roller 61 by the pressing pad 64, so that a nip region N (nip portion) is formed.

The pressing pad 64 includes a nip member 64*a* and a nip member 64*b*. The nip member 64*a* is disposed on the entrance side of the nip region N to ensure a wide nip region N. The nip member 64*b* is disposed on the exit side of the nip region N to cause strain on the heating roller 61 and to facilitate the peeling of a recording medium.

A sheet-like sliding member 68 is disposed between the pressing pad 64 and the pressure belt 62 to reduce sliding resistance between the inner circumferential surface of the pressure belt 62 and the pressing pad 64. The pressing pad 64 and the sliding member 68 are held by a holding member 65 made of metal. The belt traveling guide 63 is mounted on the holding member 65. A lubricant supply device 67, which is a device for supplying a lubricant (oil) to the inner circumferential surface of the pressure belt 62, is mounted on the belt traveling guide 63.

A peeling member 70 is an auxiliary member for peeling off a recording medium from the fixing device 60, and is disposed on the downstream side of the nip region N. The peeling member 70 includes a peeling claw 71 and a holding member 72. The peeling claw 71 is held at a position close to the heating roller 61 by the holding member 72.

The heating roller 61 is rotationally driven by a drive motor (not shown). The heating roller 61 is rotated in a direction of an arrow S by the drive motor, and the pressure belt 62 is rotated in a direction of an arrow R while following the rotation of the heating roller 61. A sheet K (an example of a recording medium) including an unfixed toner image is guided by a guide 56, and is transported to the nip region N. When the sheet K passes through the nip region N, the toner image on the sheet K is fixed by pressure and heat.

Second Exemplary Embodiment

Figure 3:
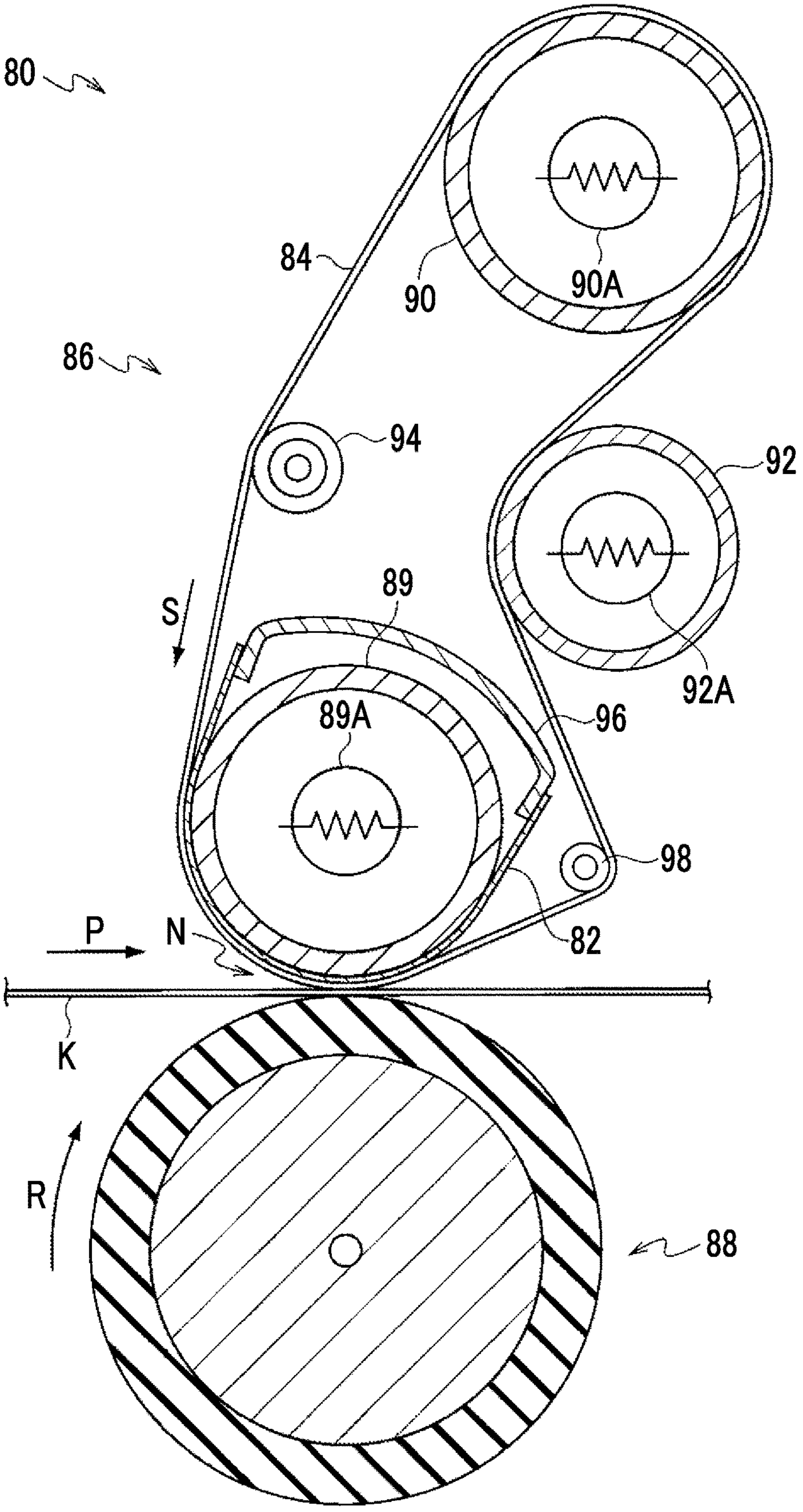
FIG. 3 is a schematic configuration diagram showing an example of a fixing device according to a second exemplary embodiment of the present disclosure.

FIG. 3 is a schematic diagram showing a fixing device 80 according to a second exemplary embodiment.

The fixing device 80 includes a fixing belt module 86 that includes a heating belt 84 (an example of the first rotating body), and a pressure roller 88 (an example of the second rotating body) that is disposed to be pressed against the heating belt 84 (fixing belt module 86).

A nip region N (nip portion) is formed at a contact portion between the heating belt 84 (fixing belt module 86) and the pressure roller 88.

The fixing belt module 86 includes a heating belt 84, a heating pressing roller 89, a support roller 90, a support roller 92, a posture correction roller 94, and a support roller 98. The heating belt 84 is wound around the heating pressing roller 89 and the support roller 90. The heating pressing roller 89 is rotationally driven by a drive motor (not shown), and presses the heating belt 84 against the pressure roller 88 from the inner circumferential surface of the heating belt 84. The support roller 92 is disposed outside the heating belt 84, and defines a circumferential path of the heating belt 84. The posture correction roller 94 corrects the posture of the heating belt 84 between the support roller 90 and the heating pressing roller 89, and suppresses the meandering of the heating belt 84. The support roller 98 applies tension to the heating belt 84 from the inner circumferential surface of the heating belt 84 on the downstream side of the nip region N.

A sheet-like sliding member 82 is disposed between the heating belt 84 and the heating pressing roller 89 to reduce sliding resistance between the inner circumferential surface of the heating belt 84 and the heating pressing roller 89. The sliding member 82 is disposed in a state where both ends of the sliding member 82 are supported by a support member 96.

A halogen heater 89A (an example of a heating device) is disposed in the heating pressing roller 89, and heats the heating belt 84 from the inner circumferential surface side of the heating belt 84.

A halogen heater 90A (an example of a heating device) is disposed in the support roller 90, and heats the heating belt 84 from the inner circumferential surface side of the heating belt 84.

A halogen heater 92A (an example of a heating device) is disposed in the support roller 92, and heats the heating belt 84 from the outer circumferential surface side of the heating belt 84.

The pressure roller 88 is rotatably supported, and is provided to be pressed against a portion of the heating belt 84, which is wound around the heating pressing roller 89, by a biasing unit (not shown). The heating belt 84 is rotationally moved in a direction of an arrow S as the heating pressing roller 89 is rotationally driven, and the pressure roller 88 is rotationally moved in a direction of an arrow R while following the rotational movement of the heating belt 84.

A sheet K (an example of a recording medium) including an unfixed toner image is transported in a direction of an arrow P, and is guided to the nip region N of the fixing device 80. When the sheet K passes through the nip region N, the toner image on the sheet K is fixed by pressure and heat.

Image Forming Apparatus

An image forming apparatus according to an exemplary embodiment of the present disclosure includes an image holding body, a charging device that charges a surface of the image holding body, an electrostatic latent image forming device that forms an electrostatic latent image on the charged surface of the image holding body, a developing device that develops the electrostatic latent image formed on the surface of the image holding body with a developer containing toner to form a toner image, a transfer device that transfers the toner image onto a surface of a recording medium, and the fixing device according to the exemplary embodiment of the present disclosure that fixes the toner image to the recording medium. The fixing device may be a cartridge that can be attached to and detached from the image forming apparatus.

Figure 4:
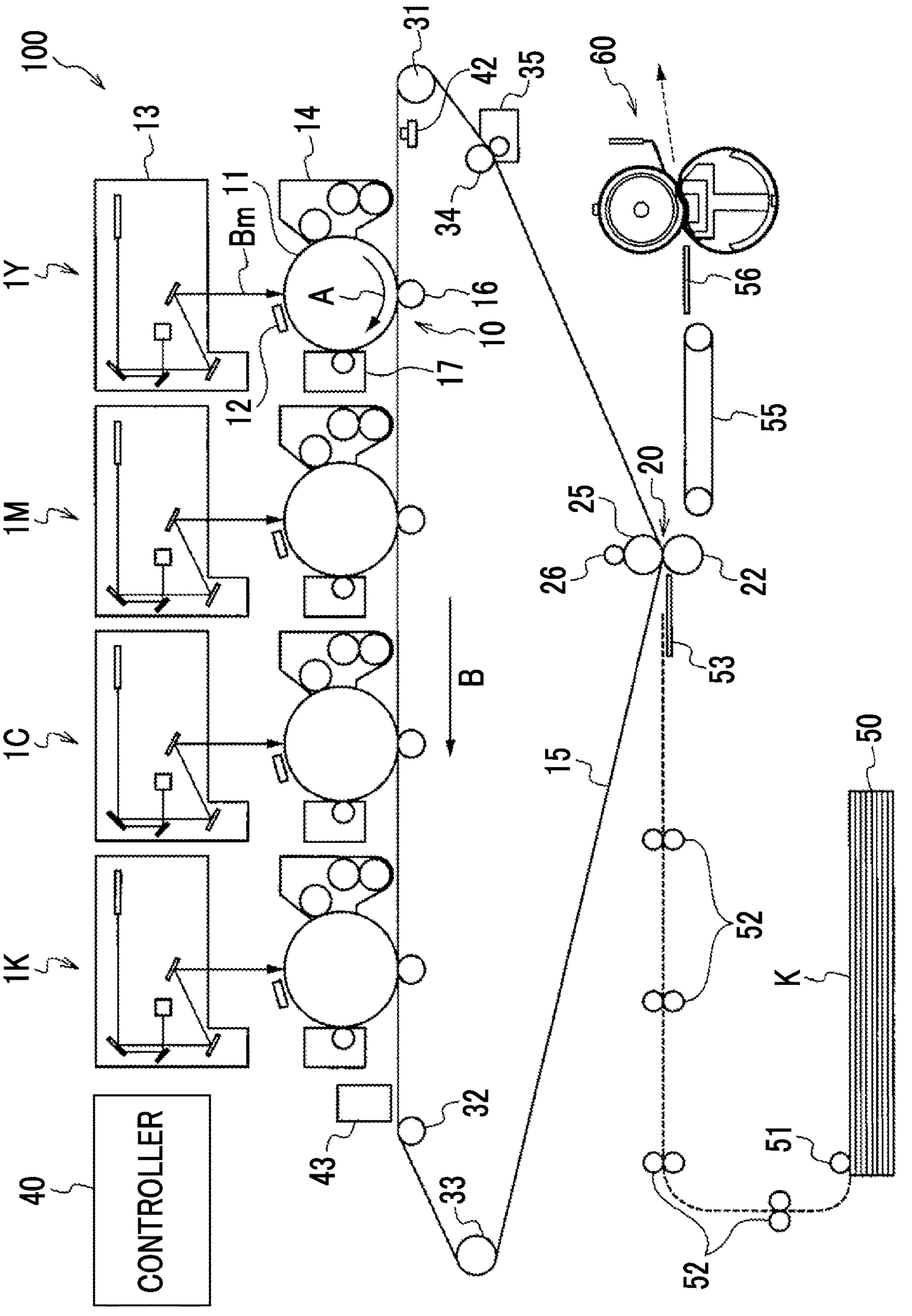
FIG. 4 is a schematic configuration diagram showing an example of an image forming apparatus according to an exemplary embodiment of the present disclosure.

FIG. 4 is a schematic diagram showing the configuration of the image forming apparatus 100 according to the present exemplary embodiment. The image forming apparatus 100 includes the fixing device 60 according to the first exemplary embodiment described above. The image forming apparatus 100 may include the fixing device 80 according to the second exemplary embodiment described above instead of the fixing device 60.

The image forming apparatus 100 is an intermediate transfer image forming apparatus that is generally called a tandem-type image forming apparatus. The image forming apparatus 100 includes image forming units 1Y, 1M, 1C, and 1K in which toner images having the respective colors are formed by an electrophotographic method, primary transfer units 10 that sequentially transfer (primarily transfer) the toner images having the respective colors onto an intermediate transfer belt 15, a secondary transfer unit 20 that collectively transfers (secondarily transfers) superimposed toner images transferred onto the intermediate transfer belt 15 to a sheet K, which is a recording medium, the fixing device 60 that fixes the secondarily transferred images onto the sheet K, and a controller 40 that controls the operation of each device (each unit).

The image forming units 1Y, 1M, 1C, and 1K are substantially linearly arranged in the order of 1Y (unit for yellow), 1M (unit for magenta), 1C (unit for cyan), and 1K (unit for black) from the upstream side of the intermediate transfer belt 15.

Each of the image forming units 1Y, 1M, 1C, and 1K includes a photoreceptor 11 (an example of the image holding body). The photoreceptor 11 is rotated in a direction of an arrow A.

A charging unit 12 (an example of a charging device), a laser exposure unit 13 (an example of an electrostatic latent image forming device), a developing unit 14 (an example of a developing device), a primary transfer roller 16, and a photoreceptor cleaner 17 are sequentially arranged around the photoreceptor 11 in a rotation direction of the photoreceptor 11.

The charging unit 12 charges the surface of the photoreceptor 11.

The laser exposure unit 13 emits an exposure beam Bm to form an electrostatic latent image on the photoreceptor 11.

The developing unit 14 stores toner having each color, and changes the electrostatic latent image formed on the photoreceptor 11 into a visible image with the toner.

The primary transfer roller 16 transfers the toner image formed on the photoreceptor 11 onto the intermediate transfer belt 15 at the primary transfer unit 10.

The photoreceptor cleaner 17 removes residual toner remaining on the photoreceptor 11.

The intermediate transfer belt 15 is a belt made of a material in which an antistatic agent, such as carbon black, is added to a resin, such as polyimide or polyamide. The intermediate transfer belt 15 has a volume resistivity of, for example, $1\times10^{6}$ Ω·cm or more and $1\times10^{14}$ Ω·cm or less and has a thickness of, for example, 0.1 mm.

The intermediate transfer belt 15 is supported by a drive roller 31, a support roller 32, a tension applying roller 33, a back roller 25, and a cleaning back roller 34, and is driven to circulate (is rotated) in a direction of an arrow B according to the rotation of the drive roller 31.

The drive roller 31 is driven by a motor (not shown) having an excellent constant speed property and rotates the intermediate transfer belt 15.

The support roller 32 supports the intermediate transfer belt 15, which substantially linearly extends in an arrangement direction of four photoreceptors 11, together with the drive roller 31.

The tension applying roller 33 applies constant tension to the intermediate transfer belt 15, and functions as a correction roller that suppresses the meandering of the intermediate transfer belt 15.

The back roller 25 is provided in the secondary transfer unit 20, and the cleaning back roller 34 is provided in a cleaning unit that scrapes off residual toner remaining on the intermediate transfer belt 15.

The primary transfer roller 16 is disposed in pressure contact with the photoreceptor 11 with the intermediate transfer belt 15 interposed between the photoreceptor 11 and the primary transfer roller 16, and forms the primary transfer unit 10.

A voltage (primary transfer bias) having a polarity opposite to the charging polarity of the toner (referred to as a negative polarity. The same applies hereinafter.) is applied to the primary transfer roller 16. Accordingly, the toner images formed on the respective photoreceptors 11 are sequentially electrostatically attracted to the intermediate transfer belt 15, so that the superimposed toner images are formed on the intermediate transfer belt 15.

The primary transfer roller 16 is a cylindrical roller that includes a shaft (for example, a columnar rod made of metal, such as iron or SUS) and an elastic layer (for example, a sponge layer made of blended rubber with which a conductive agent, such as carbon black, is mixed) fixed around the shaft. The primary transfer roller 16 has a volume resistivity of, for example, $1\times10^{7.5}$ Ω·cm or more and $1\times10^{8.5}$ Ω·cm or less.

A secondary transfer roller 22 is disposed in pressure contact with the back roller 25 with the intermediate transfer belt 15 interposed between the back roller 25 and the secondary transfer roller 22, and forms the secondary transfer unit 20.

The secondary transfer roller 22 forms a secondary transfer bias between the back roller 25 and the secondary transfer roller 22, and secondarily transfers the toner images onto the sheet K (recording medium) transported to the secondary transfer unit 20.

The secondary transfer roller 22 is a cylindrical roller that includes a shaft (for example, a columnar rod made of metal, such as iron or SUS) and an elastic layer (for example, a sponge layer made of blended rubber with which a conductive agent, such as carbon black, is mixed) fixed around the shaft. The secondary transfer roller 22 has a volume resistivity of, for example, $1\times10^{7.5}$ Ω·cm or more and $1\times10^{8.5}$ Ω·cm or less.

The back roller 25 is disposed on the back side of the intermediate transfer belt 15 to form a counter electrode of the secondary transfer roller 22, and forms a transfer electric field between the secondary transfer roller 22 and the back roller 25.

For example, a rubber substrate is covered with a tube made of blended rubber in which carbon is dispersed, so that the back roller 25 is formed. The back roller 25 has a surface resistivity of, for example, $1\times10^{7}$Ω/□ or more and $1\times10^{10}$Ω/□ or less, and has a hardness of, for example, 70° (Asker C manufactured by Kobunshi Keiki Co., Ltd., The same applies hereinafter).

A power feed roller 26 made of metal is disposed in contact with the back roller 25. The power feed roller 26 applies a voltage (secondary transfer bias) having a polarity identical to the charging polarity of the toner (negative polarity) to form a transfer electric field between the secondary transfer roller 22 and the back roller 25.

An intermediate transfer belt cleaner 35 is provided on the downstream side of the secondary transfer unit 20 of the intermediate transfer belt 15 to be freely attachable to and detachable from the intermediate transfer belt 15. The intermediate transfer belt cleaner 35 removes residual toner and paper dust on the intermediate transfer belt 15 after the secondary transfer.

A reference sensor (home position sensor) 42 is provided on the upstream side of the image forming unit 1Y. The reference sensor 42 generates a reference signal that serves as a reference used to take an image formation timing in each image forming unit. The reference sensor 42 recognizes a mark provided on the back side of the intermediate transfer belt 15 and generates a reference signal, and the image forming units 1Y, 1M, 1C, and 1K start to form images according to an instruction given from the controller 40 that recognizes this reference signal.

An image density sensor 43 used to adjust image quality is provided on the downstream side of the image forming unit 1K.

The image forming apparatus 100 includes a sheet storage part 50, a sheet feed roller 51, transport rollers 52, a transport guide 53, a transport belt 55, and a fixing entrance guide 56 as a transport member for transporting a sheet K.

The sheet storage part 50 stores sheets K on which images are not yet formed.

The sheet feed roller 51 takes out a sheet K stored in the sheet storage part 50.

The transport rollers 52 transport the sheet K that is taken out by the sheet feed roller 51.

The transport guide 53 sends the sheet K, which is transported by the transport rollers 52, to the secondary transfer unit 20.

The transport belt 55 transports the sheet K, onto which images are transferred at the secondary transfer unit 20, to the fixing device 60.

The fixing entrance guide 56 guides the sheet K to the fixing device 60.

A method of forming an image using the image forming apparatus 100 will be described.

In the image forming apparatus 100, image data output from an image reading device (not shown), a computer (not shown), or the like are subjected to image processing via an image processing device (not shown) and work for forming images is performed by the image forming units 1Y, 1M, 1C, and 1K.

In the image processing device, image processing, such as shading correction, misregistration correction, brightness/color space conversion, gamma correction, frame removal or color editing, and movement editing, is performed on input reflectance data. Image data on which the image processing is performed are converted into coloring material gradation data of four colors, that is, Y, M, C, and K, and are output to the laser exposure units 13.

The laser exposure unit 13 irradiates each of the photoreceptors 11 of the image forming units 1Y, 1M, 1C, and 1K with an exposure beam Bm according to the input coloring material gradation data.

The surface of each of the photoreceptors 11 of the image forming units 1Y, 1M, 1C, and 1K is charged by the charging unit 12 and is then scanned and exposed by the laser exposure unit 13, so that an electrostatic latent image is formed. The electrostatic latent image formed on each photoreceptor 11 is developed as a toner image having each color by each image forming unit.

The toner image formed on each of the photoreceptors 11 of the image forming units 1Y, 1M, 1C, and 1K is transferred onto the intermediate transfer belt 15 at the primary transfer unit 10 where each photoreceptor 11 and the intermediate transfer belt 15 are in contact with each other. At the primary transfer units 10, a voltage (primary transfer bias) having a polarity opposite to the charging polarity of the toner (negative polarity) is applied to the intermediate transfer belt 15 by the primary transfer rollers 16 and toner images are sequentially superimposed and transferred onto the intermediate transfer belt 15.

The toner images primarily transferred onto the intermediate transfer belt 15 are transported to the secondary transfer unit 20 with the movement of the intermediate transfer belt 15.

At a timing when the toner images reach the secondary transfer unit 20, a sheet K stored in the sheet storage part 50 is transported by the sheet feed roller 51, the transport rollers 52, and the transport guide 53, is fed to the secondary transfer unit 20, and is sandwiched between the intermediate transfer belt 15 and the secondary transfer roller 22.

Then, the toner images on the intermediate transfer belt 15 are electrostatically transferred (secondarily transferred) onto the sheet K at the secondary transfer unit 20 where a transfer electric field is formed.

The sheet K onto which the toner images are electrostatically transferred is peeled off from the intermediate transfer belt 15 by the secondary transfer roller 22 and is transported to the fixing device 60 by the transport belt 55.

The sheet K transported to the fixing device 60 is heated and pressed by the fixing device 60, so that the unfixed toner images are fixed.

An image is formed on the recording medium by the image forming apparatus 100 through the above-mentioned steps.

EXAMPLES

The tubular fixing member according to the exemplary embodiment of the present disclosure will be described in detail below using examples, but the tubular fixing member according to the exemplary embodiment of the present disclosure is not limited to these examples at all.

In the following description, all of "part" and "%" are based on mass unless otherwise specified.

In the following description, preparation, processing, manufacture, and the like are performed at a room temperature (25° C.±3° C.) unless otherwise specified.

Manufacture of Fixing Belt

Example 1

Formation of Substrate 30 parts of carbon black (SB-4, manufactured by Degussa AG) is dispersed in 100 parts of polyimide varnish (TX-HMM, manufactured by Unitika, Ltd.) to prepare coating liquid for substrate. A mold, which is made of aluminum and has a diameter of 30 mm, is coated with the coating liquid for substrate by a blade coating method, and the coating liquid for substrate is dried for 20 minutes at a temperature of 130° C., is fired for 20 minutes at a temperature of 200° C., and is fired for 20 minutes at a temperature of 380° C.

After firing, a resin layer is detached from the mold to obtain a substrate having an average thickness of 80 μm and a width of 420 mm.

Formation of Elastic Layer

A cylindrical inner mold is covered with the substrate. The substrate is coated with liquid silicone rubber (two-liquid type, X-34-2826-A/B, Shin-Etsu Chemical Co., Ltd.) by a blade coating method, and the liquid silicone rubber is dried for 15 minutes at a temperature of 115° C. and is fired for 2 hours at a temperature of 200° C. to obtain an elastic layer having an average thickness of 200 μm and a width of 400 mm.

Formation of Interlayer 8 parts of boron nitride powder (MGP, Denka Co., Ltd.) is added to 100 parts of liquid silicone rubber identical to the liquid silicone rubber used to form the elastic layer, and the mixture is stirred and mixed to prepare coating liquid. The elastic layer is coated with the coating liquid by a blade coating method. A blade for leveling the coating layer is pressed to orient the plate-shaped boron nitride powder in a plane direction of the coating layer. The coating layer is dried for 15 minutes at a temperature of 115° C. to form an interlayer having an average thickness of 100 μm.

Formation of Surface Layer

A PFA tube, which has an inner diameter of 29.3 mm, a width of 460 mm, and an average thickness of 20 μm and of which an inner surface is modified by liquid ammonia treatment, is prepared. A laminate in which the substrate, the elastic layer, and the interlayer are formed is covered with the PFA tube. After being covered with the PFA tube, the laminate is fired for 2 hours at a temperature of 200° C. so that the laminate and the PFA tube adhere. Then, the laminate and the PFA tube are detached from the inner mold and are cut to a width of 380 mm. In this way, a fixing belt (the tubular fixing member according to the exemplary embodiment of the present disclosure) is obtained.

Example 2

A fixing belt is manufactured in a manner identical to the manner of Example 1 except that an average thickness of the surface layer is changed as shown in Table 1.

Examples 3 and 4

Fixing belts are manufacturing in a manner identical to the manner of Example 1 except that an average thickness of the interlayer is changed as shown in Table 1.

Example 5

A fixing belt is manufactured in a manner identical to the manner of Example 1 except that a material in which 100 parts of liquid silicone rubber (two-liquid type, X-34-2826-A/B, Shin-Etsu Chemical Co., Ltd.) and 10 parts of liquid silicone rubber (two-liquid type, X-34-1053-A/B, Shin-Etsu Chemical Co., Ltd.) are mixed with each other is used to form an elastic layer in the formation of the elastic layer.

Example 6

A fixing belt is manufactured in a manner identical to the manner of Example 1 except that an interlayer is formed without an operation for leveling the coating layer in the formation of the interlayer.

Comparative Example 1

A fixing belt is manufactured in a manner identical to the manner of Example 1 except that an interlayer is not formed.

Comparative Example 2

A fixing belt is manufactured in a manner identical to the manner of Example 1 except that only liquid silicone rubber identical to the liquid silicone rubber used for the formation of the elastic layer (that is, without adding boron nitride powder) is used as coating liquid to form an interlayer in the formation of the interlayer. That is, the elastic layer and the interlayer are made of an identical material in Comparative Example 2.

Comparative Example 3

A fixing belt is manufactured in a manner identical to the manner of Example 1 except that a mixing ratio of two types of liquid of the liquid silicone rubber (X-34-2826-A/B which is manufactured by Shin-Etsu Chemical Co., Ltd. and to which 8 parts of boron nitride powder is added) used for the interlayer of Example 1 is changed to form an elastic layer in the formation of the elastic layer and only liquid silicone rubber identical to the liquid silicone rubber used for the formation of the elastic layer of Example 1 (that is, without adding boron nitride powder) is used as coating liquid to form an interlayer in the formation of the interlayer.

Measurement of Physical Properties and Performance Evaluation of Fixing Belt

Storage Elastic Modulus

Each of the elastic layer and the interlayer is cut into a rectangular shape having a length of 20 mm in the axial direction and a length of 4 mm in the circumferential direction, and each of the cut elastic layer and the cut interlayer is used as a sample for measurement. The sample is placed on a dynamic viscoelasticity measuring device (RHEOVIBRON DDV-01FP, manufactured by Orientec Co., Ltd.); and the dynamic viscoelasticity of the sample is measured under conditions of a temperature of 30° C., a frequency of 10 Hz, a load of 10 gf, and an amplitude of 10 μm to obtain the storage elastic modulus (MPa) of the sample. The measurement is performed for three samples, and an arithmetic average of three measured values is used as a representative value.

Thermal Conductivity

Each of the elastic layer and the interlayer is cut into a square shape having a length of 2 mm in the axial direction and a length of 2 mm in the circumferential direction, and each of the cut elastic layer and the cut interlayer is used as a sample for measurement. The sample is placed on a thermal diffusivity measuring device (ai-Phase Mobile M3 type 1, manufactured by ai-Phase Co., Ltd.), the thermal diffusivity of the sample is measured at a room temperature, and the thermal diffusivity, density, and specific heat are multiplied together to calculate the thermal conductivity (W/m·K) of the sample. The thermal conductivities of the sample in the axial direction, the circumferential direction, and the thickness direction are measured depending on the orientation of the sample in a case where the sample is interposed between a pair of measurement terminals of the thermal diffusivity measuring device. The measurement is performed for three samples, and an arithmetic average of three measured values is used as a representative value.

Wrinkles of Surface Layer

The fixing belt is mounted on a fixing device of an image forming apparatus Apeos C7070 (manufactured by FUJIFILM Business Innovation Corp.). After 300,000 sheets of A4 paper pass, the surface of the fixing belt is visually observed and a state in which wrinkles occur is classified as follows. Results are shown in Table 1.

G0: Wrinkles cannot be identified at all.

G1: Several minute wrinkles can be identified.

G2: Wrinkles can be clearly identified.

G3: More wrinkles are more greatly identified than G2.

Density Unevenness of Image

The fixing belt is mounted on a fixing device of an image forming apparatus Apeos C7070 (manufactured by FUJIFILM Business Innovation Corp.). A black halftone image (image density: 50%) is output on an OS-coated sheet (basis weight: 127 g/m$^2$) in A4 size. An image is visually observed and density unevenness is classified as follows. Results are shown in Table 1.

G0: Density unevenness cannot be identified.

G1: Slight density unevenness can be identified.

G2: Density unevenness can be more easily identified than G1.

G3: Density unevenness can be clearly identified.

Fixing Property of Image

The fixing belt is mounted on a fixing device of an image forming apparatus Apeos C7070 (manufactured by FUJIFILM Business Innovation Corp.). A solid black image (image density: 100%) is output on an OS-coated sheet (basis weight: 127 g/m$^2$) in A4 size. The sheet is folded with an image portion on the inside, and creases are made with a force of about 300 gf. The folded sheet is opened, the creases are visually observed, and the peeling of the image is classified as follows. Results are shown in Table 1.

G0: There is no peeling.

G1: There is a slight peeling when the image is observed carefully.

G2: There is some peeling, but the peeling is within an allowable range.

G3: There is unallowable peeling.

(((1)))

A tubular fixing member comprising:

a substrate, an elastic layer, an interlayer, and a surface layer laminated in this order, wherein "E1<E2" is satisfied in a case where a storage elastic modulus of the elastic layer is denoted by E1 and a storage elastic modulus of the interlayer is denoted by E2.

(((2)))

The tubular fixing member according to (((1))), wherein an average thickness of the surface layer is 10 μm or more and 20 μm or less.

((((3))))

The tubular fixing member according to (((1))) or (((2))), wherein E2 is 0.6 MPa or more and 10.0 MPa or less.

((((4))))

The tubular fixing member according to any one of (((1))) to (((3))), wherein "λ1z<λ2z" is satisfied in a case where a thermal conductivity of the elastic layer in a thickness direction is denoted by λ1z and a thermal conductivity of the interlayer in the thickness direction is denoted by λ2z.

((((5))))

The tubular fixing member according to (((4))), wherein λ1z is 0.8 W/m·K or more and 1.4 W/m·K or less.

(((6)))

The tubular fixing member according to (((4))) or (((5))), wherein λ2z is 1.0 W/m·K or more and 1.8 W/m·K or less.

(((7)))

The tubular fixing member according to any one of (((1))) to (((6))), wherein "λ2x>λ2z" and "λ2y>λ2z" are satisfied in a case where thermal conductivities of the interlayer in an axial direction, a circumferential direction, and a thickness direction are denoted by λ2x, λ2y, and λ2z, respectively.

((((8))))

The tubular fixing member according to any one of (((1))) to (((7))),

TABLE 1

| | Elastic layer | | | Interlayer | | | | | Surface layer | Performance evaluation | | |
|---|---|---|---|---|---|---|---|---|---|---|---|---|
| | Average thickness μm | Storage modulus E1 MPa | Thermal conductivity λ1z W/m · K | Average thickness μm | Storage modulus E2 MPa | Thermal conductivity λ2x W/m · K | λ2y W/m · K | λ2z W/m · K | Average thickness μm | Wrinkles of surface layer | Density unevenness of image | Fixing property of image |
| Comparative Example 1 | 200 | 0.3 | 0.8 | | | | | | 20 | G3 | G3 | G0 |
| Comparative Example 2 | 200 | 0.3 | 0.8 | 100 | 0.3 | 0.8 | 0.8 | 0.8 | 20 | G3 | G1 | G1 |
| Comparative Example 3 | 200 | 0.6 | 1.3 | 100 | 0.3 | 0.8 | 0.8 | 0.8 | 20 | G3 | G1 | G1 |
| Example 1 | 200 | 0.3 | 0.8 | 100 | 0.6 | 1.5 | 1.5 | 1.1 | 20 | G0 | G0 | G0 |
| Example 2 | 200 | 0.3 | 0.8 | 100 | 0.6 | 1.5 | 1.5 | 1.1 | 20 | G0 | G0 | G3 |
| Example 3 | 200 | 0.3 | 0.8 | 5 | 0.6 | 1.5 | 1.5 | 1.1 | 20 | G1 | G1 | G0 |
| Example 4 | 200 | 0.3 | 0.8 | 3 | 0.6 | 1.5 | 1.5 | 1.1 | 20 | G2 | G2 | G0 |
| Example 5 | 200 | 0.3 | 0.7 | 100 | 0.6 | 1.5 | 1.5 | 1.1 | 20 | G0 | G1 | G1 |
| Example 6 | 200 | 0.3 | 0.8 | 100 | 0.5 | 1.3 | 1.3 | 1.3 | 20 | G1 | G1 | G0 |

The tubular fixing member, the fixing device, and the image forming apparatus according to the exemplary embodiments of the present disclosure include the following aspects.

wherein an average thickness of the interlayer is 5 μm or more and 200 μm or less, and an average thickness of the elastic layer is larger than the average thickness of the interlayer.

((((9))))

A fixing device comprising:

a first rotating body; and a second rotating body that is disposed in contact with an outer surface of the first rotating body, wherein at least one of the first rotating body or the second rotating body is the tubular fixing member according to any one of (((1))) to (((8))), and a recording medium having a surface on which a toner image is formed passes through a contact portion between the first rotating body and the second rotating body to fix the toner image.

((((10))))

An image forming apparatus comprising:

an image holding body;

a charging device that charges a surface of the image holding body;

an electrostatic latent image forming device that forms an electrostatic latent image on the charged surface of the image holding body;

a developing device that develops the electrostatic latent image formed on the surface of the image holding body with a developer containing toner to form a toner image;

a transfer device that transfers the toner image onto a surface of a recording medium; and the fixing device according to (((9))) that fixes the toner image to the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A tubular fixing member comprising:

a substrate, an elastic layer, an interlayer, and a surface layer laminated in this order, wherein "$E1<E2$" is satisfied in a case where a storage elastic modulus of the elastic layer is denoted by E1 and a storage elastic modulus of the interlayer is denoted by E2, wherein "$\lambda 1z<\lambda 2z$" is satisfied in a case where a thermal conductivity of the elastic layer in a thickness direction is denoted by $\lambda 1z$ and a thermal conductivity of the interlayer in the thickness direction is denoted by $\lambda 2z$, and wherein $\Delta 1z$ is 0.8 W/m·K or more and 1.4 W/m·K or less.

2. A fixing device comprising:

a first rotating body; and a second rotating body that is disposed in contact with an outer surface of the first rotating body, wherein at least one of the first rotating body or the second rotating body is the tubular fixing member according to claim 1, and wherein the fixing device is configured such that a recording medium having a surface on which a toner image is formed passes through a contact portion between the first rotating body and the second rotating body to fix the toner image.

3. An image forming apparatus comprising:

an image holding body;

a charging device configured to charge a surface of the image holding body;

an electrostatic latent image forming device configured to form an electrostatic latent image on the charged surface of the image holding body;

a developing device configured to develop the electrostatic latent image formed on the surface of the image holding body with a developer containing toner to form a toner image;

a transfer device configured to transfer the toner image onto a surface of a recording medium; and the fixing device according to claim 2, configured to fix the toner image to the recording medium.

4. A tubular fixing member comprising:

a substrate, an elastic layer, an interlayer, and a surface layer laminated in this order, wherein "$E1<E2$" is satisfied in a case where a storage elastic modulus of the elastic layer is denoted by E1 and a storage elastic modulus of the interlayer is denoted by E2, wherein "$\lambda 1z<\lambda 2z$" is satisfied in a case where a thermal conductivity of the elastic layer in a thickness direction is denoted by $\lambda 1z$ and a thermal conductivity of the interlayer in the thickness direction is denoted by $\lambda 2z$, and wherein $\lambda 2z$ is 1.0 W/m·K or more and 1.8 W/m·K or less.

5. A fixing device comprising:

a first rotating body; and a second rotating body that is disposed in contact with an outer surface of the first rotating body, wherein at least one of the first rotating body or the second rotating body is the tubular fixing member according to claim 4, and wherein the fixing device is configured such that a recording medium having a surface on which a toner image is formed passes through a contact portion between the first rotating body and the second rotating body to fix the toner image.

6. An image forming apparatus comprising:

an image holding body;

a charging device configured to charge a surface of the image holding body;

an electrostatic latent image forming device configured to form an electrostatic latent image on the charged surface of the image holding body;

a developing device configured to develop the electrostatic latent image formed on the surface of the image holding body with a developer containing toner to form a toner image;

a transfer device configured to transfer the toner image onto a surface of a recording medium; and the fixing device according to claim 5, configured to fix the toner image to the recording medium.

7. A tubular fixing member comprising:

a substrate, an elastic layer, an interlayer, and a surface layer laminated in this order, wherein "$E1<E2$" is satisfied in a case where a storage elastic modulus of the elastic layer is denoted by E1 and a storage elastic modulus of the interlayer is denoted by E2, and wherein "$\lambda 2x>\lambda 2z$" and "$\lambda 2y>\lambda 2z$" are satisfied in a case where thermal conductivities of the interlayer in an axial direction, a circumferential direction, and a thickness direction are denoted by $\lambda 2x$, $\lambda 2y$, and $\lambda 2z$, respectively.

8. A fixing device comprising:
a first rotating body; and
a second rotating body that is disposed in contact with an outer surface of the first rotating body,
wherein at least one of the first rotating body or the second rotating body is the tubular fixing member according to claim 7, and
wherein the fixing device is configured such that a recording medium having a surface on which a toner image is formed passes through a contact portion between the first rotating body and the second rotating body to fix the toner image.

9. An image forming apparatus comprising:
an image holding body;
a charging device configured to charge a surface of the image holding body;
an electrostatic latent image forming device configured to form an electrostatic latent image on the charged surface of the image holding body;
a developing device configured to develop the electrostatic latent image formed on the surface of the image holding body with a developer containing toner to form a toner image;
a transfer device configured to transfer the toner image onto a surface of a recording medium; and
the fixing device according to claim 8, configured to fix the toner image to the recording medium.

* * * * *